(12) United States Patent
Ahn et al.

(10) Patent No.: US 7,314,304 B2
(45) Date of Patent: Jan. 1, 2008

(54) BACKLIGHT UNIT

(75) Inventors: In Ho Ahn, Taegu-kwangyokshi (KR); Jae Ho Lee, Taegu-kwangyokshi (KR); Yong Kon Lee, Seoul (KR); Tae Wook Lee, Ulsen (KR)

(73) Assignee: Alps Electric Co., Ltd., Tokyo (JP)

( * ) Notice: Subject to any disclaimer, the term of this patent is extended or adjusted under 35 U.S.C. 154(b) by 82 days.

(21) Appl. No.: 11/171,675

(22) Filed: Jun. 30, 2005

(65) Prior Publication Data
US 2006/0023471 A1 Feb. 2, 2006

(30) Foreign Application Priority Data
Jul. 30, 2004 (KR) .................. 10-2004-0060234

(51) Int. Cl.
F21V 7/04 (2006.01)
F21V 23/02 (2006.01)
F21S 4/00 (2006.01)
G09G 3/00 (2006.01)

(52) U.S. Cl. .................. 362/631; 362/630; 362/221; 345/102

(58) Field of Classification Search ................ 362/249, 362/382, 221, 630, 631, 613; 313/3, 251, 313/49; 361/784; 345/102, 87; 315/291
See application file for complete search history.

(56) References Cited

U.S. PATENT DOCUMENTS 6,326,738 B1 * 12/2001 McAndrew ............ 315/227 R
6,843,584 B2 * 1/2005 Bang et al. .................. 362/249
6,984,056 B2 * 1/2006 Amano et al. .............. 362/225
7,095,180 B2 * 8/2006 Emslie et al. ................ 315/161
2005/0007333 A1 * 1/2005 Han et al. .................... 345/102
2005/0111225 A1 * 5/2005 Kim et al. .................. 362/276
2005/0243260 A1 * 11/2005 Kim ............................ 349/149

FOREIGN PATENT DOCUMENTS

KR 2003-0010403 2/2003

OTHER PUBLICATIONS

Office Action dated Jun. 15, 2006, for corresponding Korean Patent Application No. 10-2004-0060234.

* cited by examiner

Primary Examiner—Jong-Suk (James) Lee
(74) Attorney, Agent, or Firm—Brinks Hofer Gilson & Lione

(57) ABSTRACT

A backlight unit is disclosed, to remove an unnecessary portion from a PCB and to decrease the number of connectors and wires, which includes a plurality of light-emitting lamps arranged in one direction inside a lamp housing; first and second driving unit PCBs positioned at both sides on the rear surface of the lamp housing, to apply a power to the light-emitting lamps; first and second connection PCBs positioned at both sides of the lamp housing, wherein the respective first and second connection PCBs are separately provided from the first and second driving unit PCBs; and first and second power supplying wires for the respective connection between the first and second driving unit PCBs with the first and second connection unit PCBs.

15 Claims, 6 Drawing Sheets

BACKLIGHT UNIT

This application claims the benefit of the Korean Application No. P2004-60234 filed on Jul. 30, 2004, which are hereby incorporated by reference.

BACKGROUND OF THE INVENTION

1. Field of the Invention

The present invention relates to a backlight unit, and more particularly, to a backlight unit to minimize the area of an inverter PCB and to decrease the number of connectors and power sources required for the backlight unit.

2. Discussion of the Related Art

A cathode ray tube (CRT), a type of flat display device, has been widely used in various applications, including television monitors, measuring machines, and information terminals. However, CRTs cannot satisfy demands for miniaturization and weight requirements due to their large size and relatively high weight. Therefore, various types of alternative technologies have been successfully used as substitutes for CRTs including: liquid crystal displays (LCD), which use an electric field optical effect, plasma display panels (PDP) which use gas discharge, and electroluminescence display devices (ELD), which use an electric field luminous effect.

Among the various display devices, LCD devices have been most actively studied and developed because of their advantageous characteristics such as compact size, low weight, and low power consumption. LCDs have been used in many applications that require ultra-thin flat display devices, for example, monitors for spacecraft, aircraft, notebook computers, laptop computers, desktop computers and other types of large display devices. Because of these various applications, the demand for the LCD devices is continuously increasing.

Most LCD devices operate by controlling the light transmittance from an ambient light source to the display image. Accordingly, it is necessary to provide a light source such as a backlight unit in an LCD panel. In general, the backlight unit used in LCD devices has a cylindrical light-emitting lamp, which is classified into two types according to the arrangement of the light-emitting lamps, either a direct type backlight unit or an edge type backlight unit.

In edge type backlight units, a lamp unit is provided at one side of a light-guiding plate, with the lamp unit being provided with a lamp that emits light. Additionally, a lamp holder is inserted into both ends of the lamp to protect the lamp, and a reflective sheet is provided with one side of the sheet inserted into the light-guiding plate and surrounding the circumference of the lamp. The sheet reflects the light emitted from the lamp toward the light-guiding plate. Because of this structure7 edge type backlight units are generally used in relatively small sized LCD devices such as monitors for laptop computers and desktop computers. Edge type backlight units are advantageous in these applications because they allow the LCD unit to feature a great uniformity of light, a long life span, and a thin profile.

With trends toward using larger sized LCD devices of 20-inches or more, the direct type backlight unit is being actively developed. Direct type backlight units include a plurality of lamps that are formed in parallel on a lower surface of a light-diffusion sheet, whereby an entire surface of the LCD panel is directly illuminated with the light. The direct type backlight unit has greater light efficiency as compared with the edge type backlight unit, and is therefore often used with large-sized LCD devices that require high luminance. For example, direct type backlight units are often used for large-sized monitors or televisions. These units are often operated for extended periods of time and often have long service lives, which often causes lamps to burn out or otherwise become inoperable.

The loss of one lamp in an edge type backlight unit only causes a slight decrease in luminance on the LCD screen. As discussed above, direct type LCD devices are provided with a plurality of lamps directly under the screen of the LCD panel. Accordingly, if one of the lamps burns out or becomes inoperable, the portion of the LCD screen corresponding to the lost lamp is darker than the surrounding portions of the screen.

The edge and direct type LCD devices may use any of the following types of light sources: Electro Luminescence (EL), Light Emitting Diode (LED), Cold Cathode Fluorescent Lamp (CCFL), Hot Cathode Fluorescent Lamp (HCFL) or External Electrode Light-emitting Lamp (EEFL).

Hereinafter, a related art direct type backlight unit using a CCFL will be described with reference to the accompanying drawings, although backlight units with the other types of light sources are equally applicable within the scope of the embodiments.

FIG. 1 is a perspective view of a direct type backlight unit using a CCFL according to the related art. FIG. 2 is a schematic view of showing power supplying wires connected with a light-emitting lamp and a connector of FIG. 1.

As shown in FIG. 1, a related art direct type backlight unit includes a plurality of light-emitting lamps 1, an outer case 3, and a light-scattering means 5a, 5b and 5c. The outer case 3 fixes and supports the plurality of light-emitting lamps 1, and the light-scattering means 5a, 5b and 5c is provided between the light-emitting lamps 1 and an LCD panel (not shown).

The light-scattering means 5a, 5b and 5c is formed of multiple diffusion sheets and one diffusion plate and prevents the silhouette of the light-emitting lamps 1 from being shown on a display surface of the LCD panel (not shown). This structure and orientation provides a light source with uniform luminance. Also, a reflective sheet 7 is provided inside the outer case 3 for concentrating the light emitted from the light-emitting lamps 1 to the display part of the LCD panel, which improves the efficiency of the unit.

In the preferred embodiments, each light-emitting lamp 1 is formed from a Cold Cathode Fluorescent Lamp (CCFL). Also, electrodes 2 and 2a are provided at each end of each CCFL, and the CCFL emits light when electrical power is provided to the electrodes. The ends of each of the light-emitting lamps 1 are fixed to the sides of the outer case 3. Power supplying wires 9 and 9a are connected to the electrodes 2 and 2a that are provided at the ends of each of the light-emitting lamps 1 to transmit power to the light-emitting lamps 1. The power supplying wires 9 and 9a are connected to a driving circuit by an additional connector. Each light-emitting lamp 1 requires an individual connector. As shown in FIG. 2, the power supplying wire 9 connected to one electrode 2 of the fluorescent lamp and the power supplying wire 9a connected to the other electrode 2a of the fluorescent lamp are together connected to one connector 11. The power supplying wires 9 and 9a are curved around the lower side of the outer case 3, and then connected to the connector 11.

In the related art backlight unit for the LCD device, the connector is connected with the power supplying wire of the light-emitting lamp, which is connected to the driving circuit. As discussed above, each of the light-emitting lamps requires an individual connector. Accordingly, the wiring of the related art backlight unit is very complicated. Moreover, the efficiency of the unit is lowered because the power supplying wires are curved and then are connected with the connector in order to decrease the thickness of the backlight unit. Therefore, it is necessary to perform many additional steps to wire the unit, which lowers the manufacturing efficiency and the yield due to the increased number of manufacturing steps.

Additionally, connecting the electrodes with the connector requires the formation of two holes for each lamp that pass through the outer case, and then the insertion of both electrodes of the light-emitting lamp into and through the holes. Accordingly, these steps lower the manufacturing efficiency and make maintenance and repair of the light-emitting lamp more difficult and costly.

Hereinafter, a related art backlight unit will be described with reference to the accompanied drawings.

FIG. 3 is a schematic view of the rear of a backlight unit with a CCFL according to the related art. FIG. 4 is an expanded plane view showing the inverter of FIG. 3.

As shown in FIGS. 3 and 4, a backlight unit using a CCFL according to the related art includes a plurality of light-emitting lamps (not shown) and first and second inverter PCBs 30 and 40. The plurality of light-emitting lamps are mounted or formed on a lower supporter 20. Then, the first and second inverter PCBs 30 and 40 are respectively provided in the left and right sides of the lower supporter 20 to apply a voltage to electrodes formed at both ends of the light-emitting lamps.

Each of the first and second inverter PCBs 30 and 40 includes a connection unit 31 and a driving unit 32. The connection unit 31 includes a plurality of output connectors 33 to apply voltage to the both ends of each of the light-emitting lamps, while each of the output connectors 33 have a pair of high-voltage capacitors 34a and 34b. Also, the driving unit 32 includes a plurality of transformers 35a, 35b, 35c, and 35d, a power connector 37, and a synchronization cable connector 36. The plurality of transformers 35a, 35b, 35c, and 35d apply a raised voltage to the plurality of high-voltage capacitors 34a and 34b. Also, the power connector 37 applies power to the transformers 35a, 35b, 35c and 35d, and the synchronization cable connector 36 synchronizes the first and second inverter PCBs 30 and 40.

Two light-emitting lamps are connected with each of the output connectors 33 of the connection unit 31. Also, in state of forming the pairs of the high-voltage connectors 34a and 34b, the pairs of high-voltage connectors 34a and 34b are connected with the transformers 33 in parallel.

The light-emitting lamps of the backlight unit using a CCFL are driven by connecting each light-emitting lamp with a transformer. Accordingly, because the number of transformers corresponds to the number of light-emitting lamps, the production cost and the size of the backlight unit increases with the larger size of the LCD model. In order to decrease the size of the backlight unit, high-voltage capacitors 34a and 34b are provided corresponding with the light-emitting lamps, which allows the high-voltage capacitors 34a and 34b to be connected with the transformers 33 in parallel.

However, even though the first and second inverter PCBs 30 and 40 are provided to allow a decrease in the number of transformers 33, the length of the connection unit 31 increases. As a result, an unnecessary portion (shown with the slanted lines in FIG. 4) is formed in the lower and upper parts of the driving unit 32.

As the size of the LCD device increases, the size of the unnecessary PCB portion increases with the addition of more light-emitting lamps and the increase in the length of the connection unit. This additional size of the unnecessary PCB portion in the lower and upper parts increases the production cost and the size of the backlight unit.

SUMMARY OF THE INVENTION

Accordingly, the present invention is directed to a backlight unit that substantially eliminates one or more of the limitations or disadvantages of the related art.

A backlight unit is disclosed that removes or minimizes an unnecessary portion from a PCB and decreases the number of connectors and wires.

A backlight unit includes a plurality of light-emitting lamps that are arranged in one direction inside a lamp housing. In addition, first and second driving unit PCBs that apply power to the light-emitting lamps are positioned at both sides on the rear surface of the lamp housing. Additionally, first and second connection PCBs are positioned at both sides of the lamp housing, which are separate from the first and second driving unit PCBs. Finally, first and second power supply wires are provided for connections between the first and second driving unit PCBs with the respective first and second connection unit PCBs.

Additional advantages, objects, and features of the invention will be set forth in part in the description which follows and will become apparent to those having ordinary skill in the art upon examination of the following or may be learned from practicing the invention. The objectives and other advantages of the invention may be realized and attained by the structure particularly pointed out in the written description and claims thereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a backlight unit according to the preferred embodiment of the present invention will be described with reference to the accompanying drawings.

Figure 1:
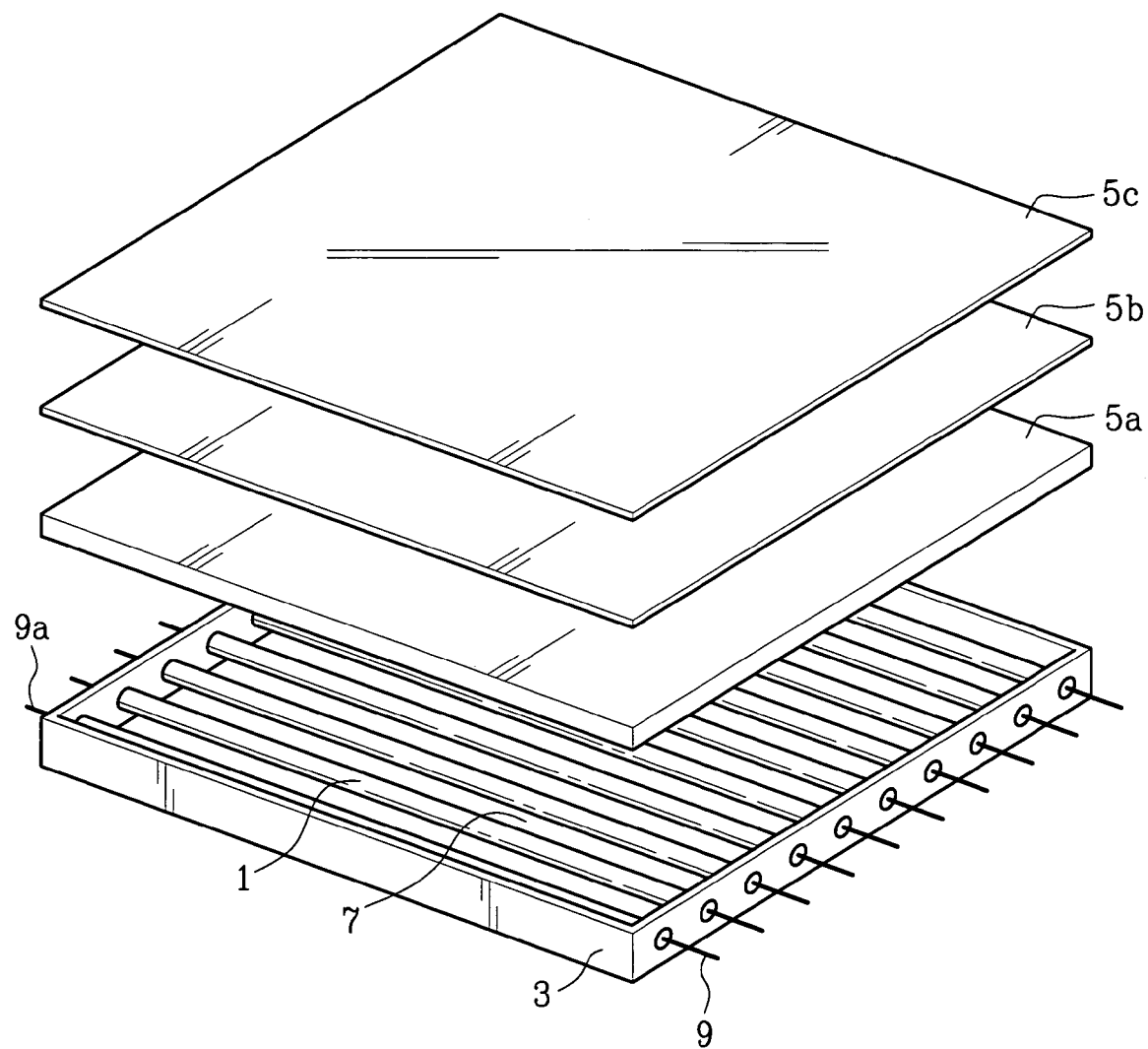
FIG. 1 is a perspective view of showing a direct type backlight unit according to the related art.
Figure 2:
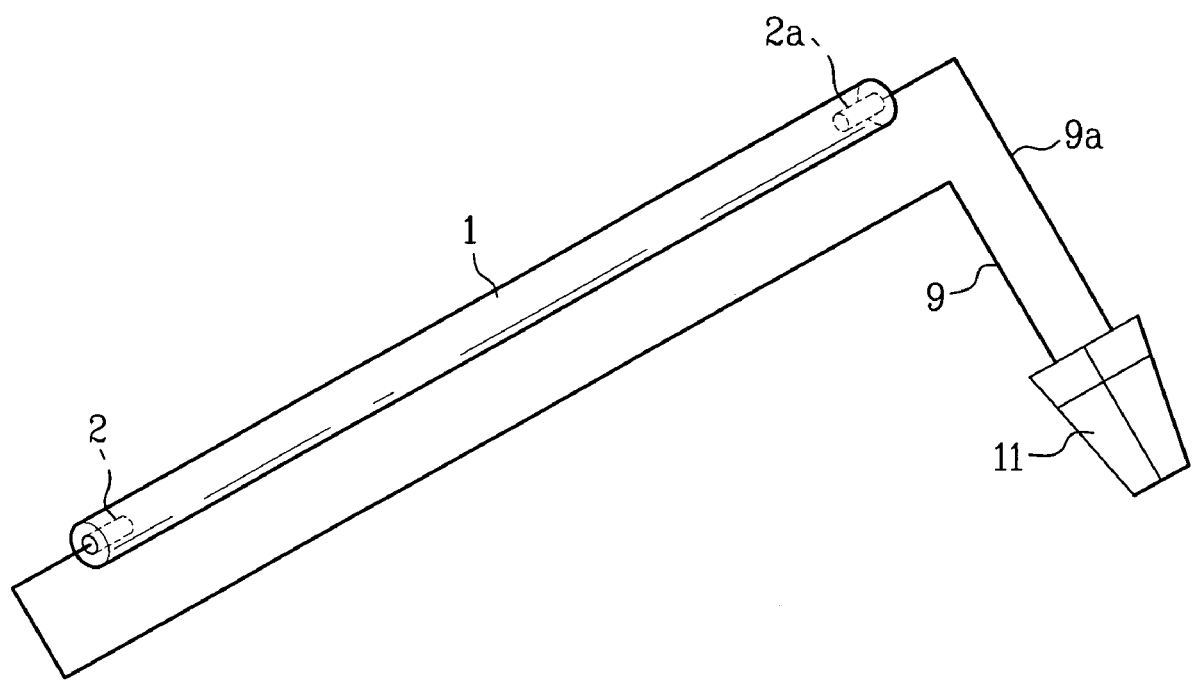
FIG. 2 is a schematic view of showing a power supplying wire connected with a light-emitting lamp and a connector according to the related art.
Figure 3:
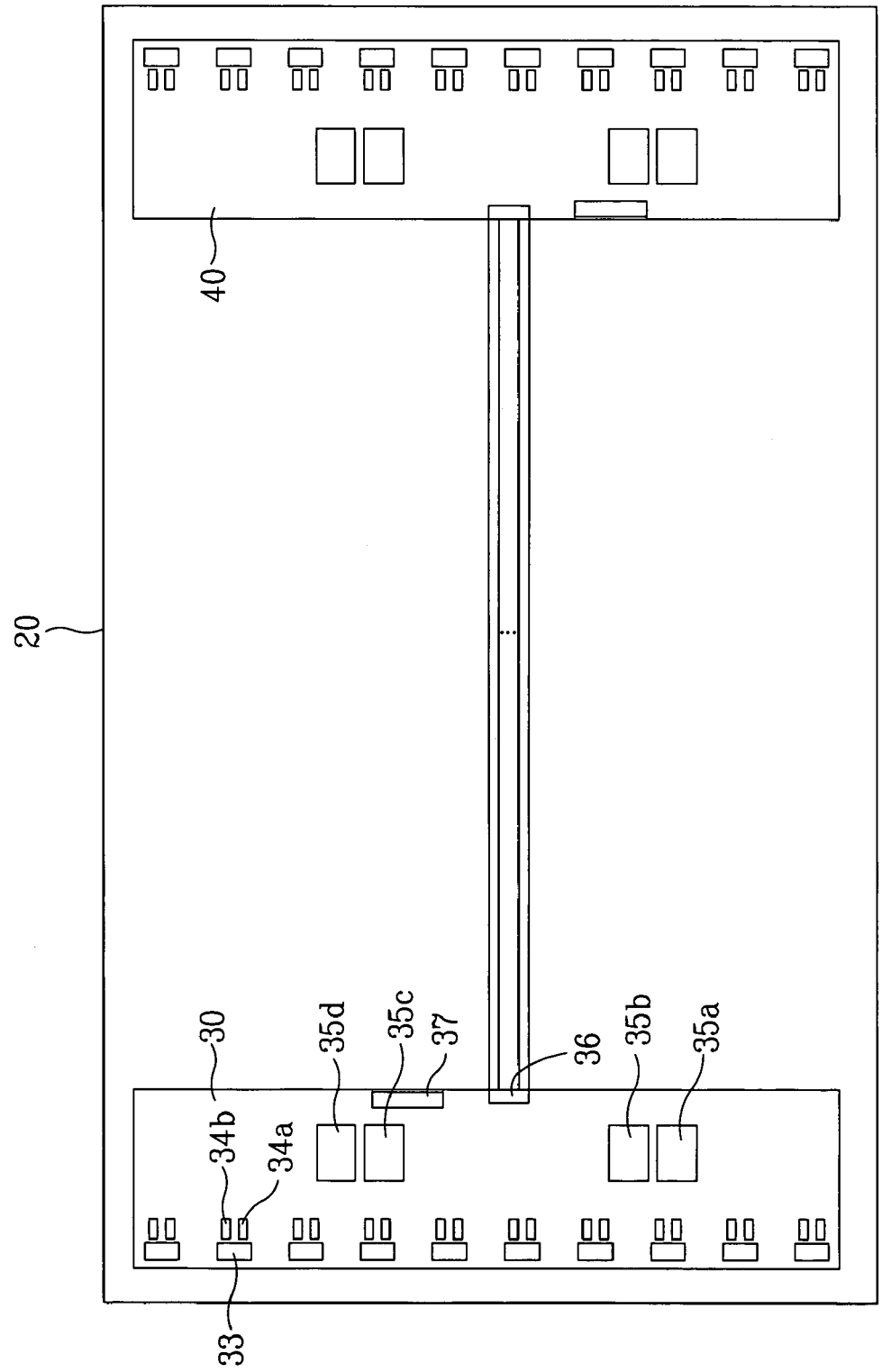
FIG. 3 is a schematic view of showing the rear of a backlight unit having a CCFL according to the related art.
Figure 4:
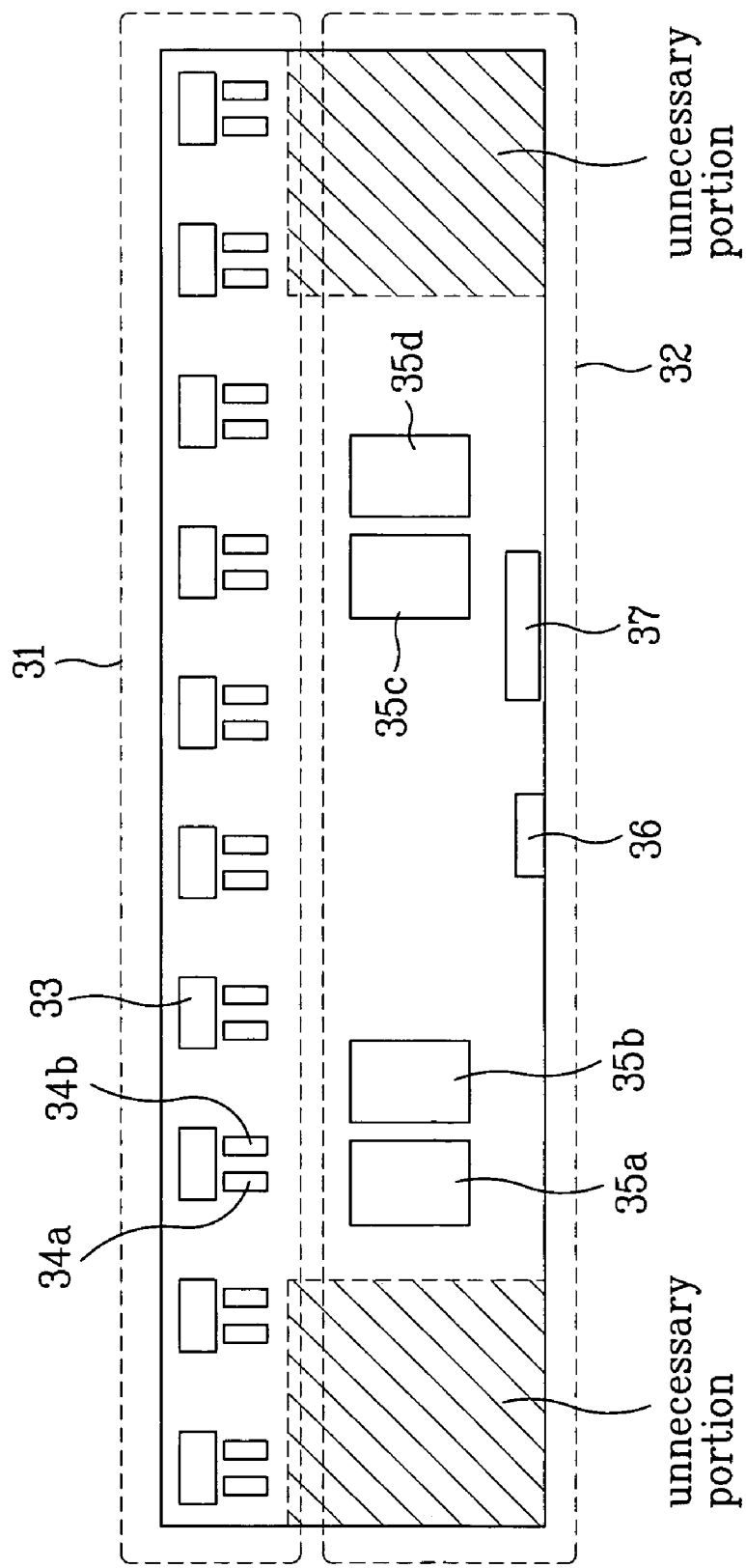
FIG. 4 is an expanded plan view of showing an inverter of FIG. 3.
Figure 5:
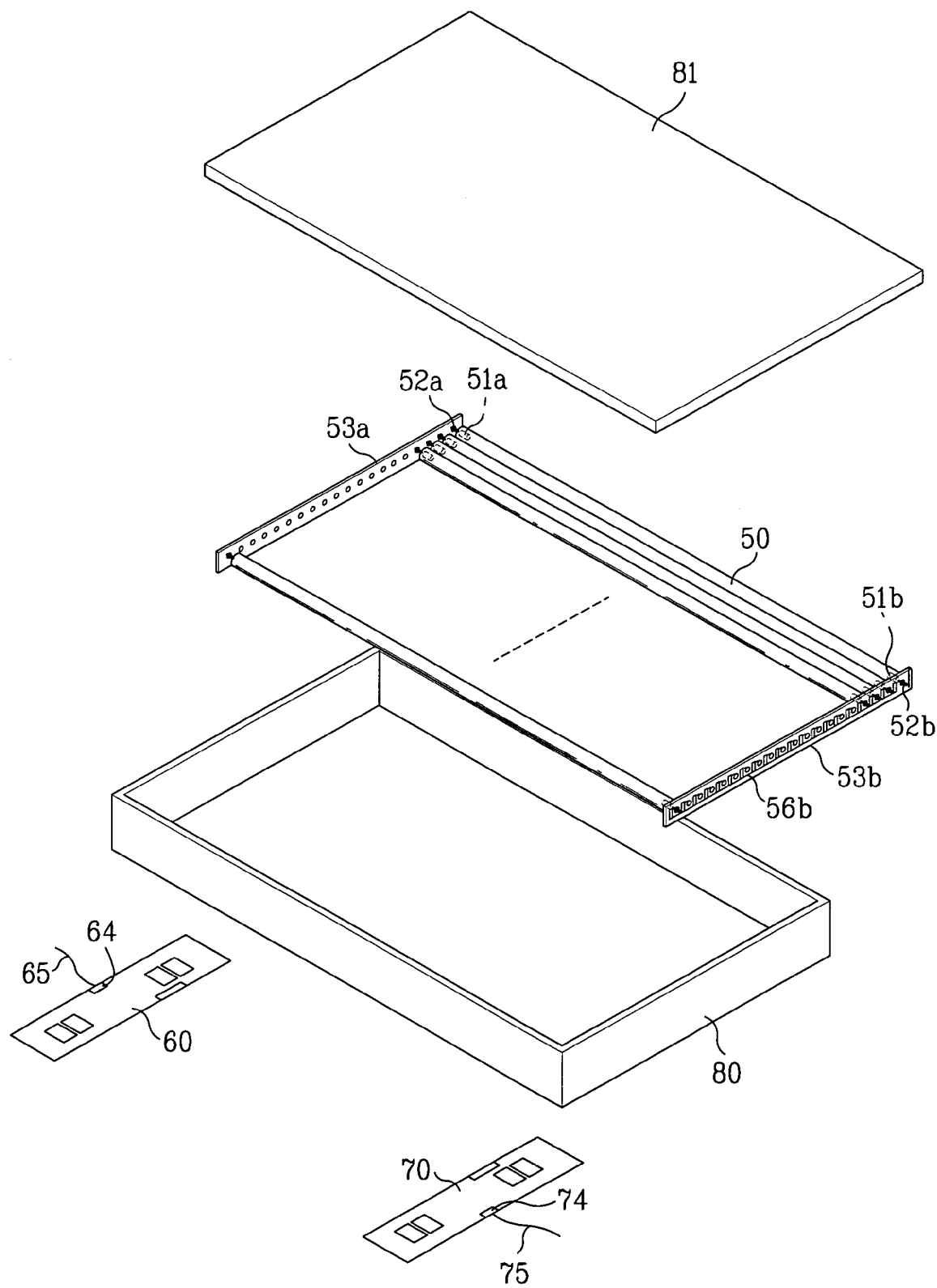
FIG. 5 is a perspective view of showing a backlight unit according to the preferred embodiment of the present invention.
Figure 6:
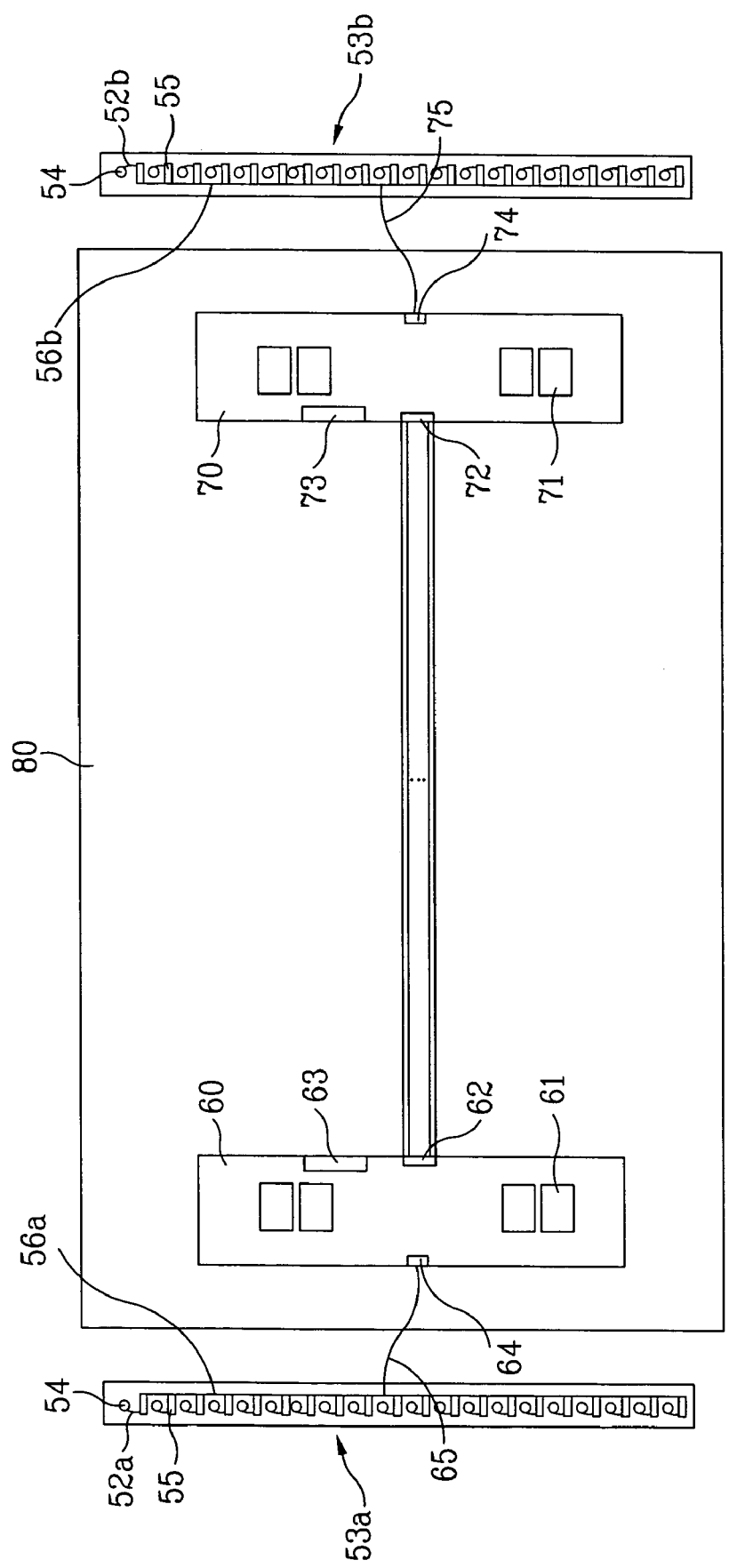
FIG. 6 is a plan view of showing a connection unit PCB and a driving unit PCB in a backlight unit of FIG. 5.

FIG. 5 is a perspective view of a backlight unit according to a preferred embodiment of the present invention. FIG. 6 is a plan view of the backlight unit of FIG. 5 showing a connection unit PCB and a driving unit PCB.

As shown in FIGS. 5 and 6, a backlight unit according to a preferred embodiment of the present invention includes a plurality of light-emitting lamps 50, first and second driving unit PCBs 60 and 70, and first and second connection unit PCBs 53a and 53b. As shown in FIG. 5, the plurality of light-emitting lamps 50 are oriented in the same direction. Also, the first and second driving unit PCBs 60 and 70 apply a voltage to the plurality of light-emitting lamps 50. The first and second connection unit PCBs 53a and 53b are separated from the first and second driving unit PCBs 60 and 70, respectively.

Normally, the first driving unit PCB 60 functions as a master driving unit PCB, and the second driving unit PCB 70 functions as a slave driving unit PCB.

The light-emitting lamp 50 is formed of a cold cathode fluorescent lamp (CCFL). The first and second electrodes 51a and 51b of the light-emitting lamp 50 are formed at the internal ends of a tube. Also, the first and second electrodes 51a and 51b are respectively connected with first and second power supplying wires 52a and 52b to transmit a voltage to the light-emitting lamp 50.

The first and second connection unit PCBs 53a and 53b have a plurality of holes 54 in correspondence with the first and second power supplying wires 52a and 52b of the light-emitting lamp 50. In this state, a plurality of high-voltage capacitors 55 are positioned on each of the first and second connection unit PCBs 53a and 53b, wherein the plurality of high-voltage capacitors 55 are in one-to-one correspondence with the first and second power supplying wires 52a and 52b through the holes 54. Also, the high-voltage capacitors 55 of the first connection unit PCB 53a are connected with a first common line 56a, and the high-voltage capacitors 55 of the second connection unit PCB 53b are connected with a second common line 56b.

Each of the first and second driving unit PCBs 60 and 70 has a transformer 61 or 71, a power source connector 63 or 73, a synchronization cable connector 62 or 72, and a first or second connector 64 or 74. The transformers 61 and 71 apply a raised voltage to the plurality of high-voltage capacitors 55. The power supply connectors 63 and 73 apply power to the transformers 61 and 71. Also, the synchronization cable connectors 62 and 72 synchronize the first and second driving unit PCBs 60 and 70, respectively. The first and second connectors 64 and 74 transmit the power to the first and second connection unit PCBs 53a and 53b, respectively.

The first and second connection unit PCBs 53a and 53b are connected with the first and second driving unit PCBs 60 and 70 by first and second power supply wires 65 and 75, respectively. In other words, the first power supply wire 65 connects the first common line 56a of the first connection unit PCB 53a with the first connector 64 of the first driving unit PCB 60. Similarly, the second power supply wire 75 connects the second common line 56b of the second connection unit PCB 53b with the second connector 74 of the second driving unit PCB 70.

The plurality of light-emitting lamps 50 are arranged in one direction inside a lamp housing 80. Also, the first and second connection unit PCBs 53a and 53b are arranged at opposite sides of the lamp housing 80, wherein the ends of each of the light-emitting lamps 50 are provided in the respective first and second connection unit PCBs 53a and 53b. The first and second driving unit PCBs 60 and 70 are provided at both sides on the rear surface of the lamp housing 80.

The plurality of transformers 61 and 71 formed on the first and second driving unit PCBs 60 and 70 are each connected with the high-voltage capacitors 55 through the first and second connectors 64 and 74, the first and second power supply wires 65 and 75, and the first and second common lines 56a and 56b. Accordingly, the backlight unit according to the preferred embodiment of the present invention does not require additional wires for connecting the plurality of high-voltage capacitors with the transformers.

Also, the first and second power supply wires 52a and 52b of the light-emitting lamps 50 are directly connected with the high-voltage capacitors 55 through the holes 55. Accordingly, there is no requirement or need for the output connectors provided in a connection unit that is used in the related art discussed above.

The first and second driving unit PCBs 60 and 70 are respectively separated from the first and second connection unit PCBs 53a and 53b. Accordingly, even though there is a demand of a large-sized LCD device, only the minimum necessary parts are formed within the driving unit PCB, therefore, the size of the driving unit PCB is not increased when the LCD device size is increased.

In addition, light-scattering means 81 is provided between the light-emitting lamp 50 and the LCD panel (not shown). The light-scattering means 81 is formed from diffusion sheets and diffusion plates. The light scattering means 81 prevents the silhouette of the light-emitting lamps 50 from being seen on the LCD panel (not shown), and provides the LCD panel with a uniform luminance light source. Also, a reflective sheet may be provided on the inner surface of the lamp housing 80, which concentrates the light emitted from the light-emitting lamp 50 to the display part of the LCD panel and thereby improves the light efficiency.

As mentioned above, the backlight unit according to the preferred embodiment of the present invention has the following advantages.

According to the preferred embodiment of the present invention, the driving unit PCB is separated from the connection unit PCB to decrease the production cost by minimizing the unnecessary area in the driving unit PCB.

The first and second power supply wires of the light-emitting lamps are directly connected with the high-voltage capacitors through the holes in the first and second connection unit PCBs. Accordingly, it is possible to remove the output connectors from the connection unit PCB, thereby decreasing the production cost.

In addition, it is possible to remove the plurality of wires for connecting the transformers with the high-voltage capacitors, which also decreases the production cost.

It will be apparent to those skilled in the art that various modifications and variations can be made in the present invention. Therefore, it is intended that the present invention covers the modifications and variations of this invention provided they come within the scope of the appended claims and their equivalents.

What is claimed is:

1. A backlight unit comprising:
   a plurality of light-emitting lamps arranged in one direction inside a lamp housing;

first and second driving unit PCBs positioned at both sides of a rear surface of the lamp housing, the first and second driving unit PCBs applying power to the light-emitting lamps;

first and second connection PCBs positioned at both sides of the lamp housing, wherein the first and second connection PCBs are distinct from the first and second driving unit PCBs;

first and second power supply wires connecting the first and second driving unit PCBs with respective first and second connection unit PCBs;

first and second connectors of respective first and second driving unit PCBs; and first and second common lines of respective first and second connection unit PCBs, wherein the first power supply wire is connected between the first connector and the first common line, and the second power supply wire is connected between the second connector and the second common line.

2. The backlight unit of claim 1, wherein the light-emitting lamp is formed as a tube of a cold cathode fluorescent lamp (CCFL), the light-emitting lamp comprising a first electrode formed at a first end of the tube and a second electrode formed at a second end of the tube, the first and second electrodes connected with respective first and second power supply wires.

3. The backlight unit of claim 1, wherein the first and second connection PCBs each further comprise:
a plurality of holes in correspondence with a plurality of first and second power supplying wires of the light-emitting lamps; and
a plurality of high-voltage capacitors connected with respective first and second power supplying wires through the holes and the first and second common lines connecting together the plurality of high-voltage capacitors.

4. The backlight of claim 3, wherein the first and second driving unit PCBs each further comprise:
transformers operatively connected to the plurality of high-voltage capacitors;
power source connectors applying power to the transformers; and
synchronization cable connectors synchronizing the first and second driving unit PCBs, wherein the first and second connectors transmit power to respective first and second connection unit PCBs.

5. The backlight of claim 1, wherein the first and second driving unit PCBs further comprise a plurality of transformers connected with high-voltage capacitors through respective first and second connectors, first and second power supply wires, and first and second common lines.

6. The backlight unit of claim 1, further comprising a light-scattering means formed of light-diffusion sheets and light-diffusion plates provided above the light-emitting lamps.

7. The backlight unit of claim 1, further comprising a reflective sheet formed on an inner surface of the lamp housing.

8. A backlight unit for an LCD device comprising:
a plurality of light-emitting lamps within a lamp housing, each lamp having a first and a second end;
a first and a second connection unit PCB, each connection unit PCB supporting an end of the lamps; and
a first and a second driving unit PCB, each driving unit PCB being connected to the respective connection unit PCB with a power supply, wherein the first and second connection unit PCBs are distinct from the first and second driving unit PCBs wire;
a first and a second connector of respective driving unit PCBs; and
a first and a second common line of respective connection unit PCBs, wherein the power supply wire of respective driving unit PCBs connects the first connector to the first common line and the second connector to the second common line.

9. The backlight unit of claim 8, wherein the first and second connection unit PCBs comprise:
a plurality of holes in correspondence with a first and a second power supplying wire of each light-emitting lamp; and
a plurality of high-voltage capacitors connected with each of the first and second power supplying wires through the holes and the first and second common lines connecting together the plurality of high voltage capacitors.

10. The backlight unit of claim 8, wherein the first and the second driving unit PCBs each comprise:
a plurality of transformers operatively connected to respective first or second connection unit PCB;
a power source connector for applying power to the plurality of transformers;
a synchronization cable connector for synchronizing the first and second driving unit PCBs together, wherein the first and second connectors transmit power to the respective first or second connection unit PCB.

11. The backlight unit of claim 8, wherein the first and second connection unit PCBs comprise:
a plurality of holes in correspondence with a first and a second power supply supplying wire of each light-emitting lamp;
a plurality of high-voltage capacitors connected with each of the first and second power supplying wires through the holes, wherein the first and second common lines connect together the plurality of high voltage capacitors; and
wherein the first and second driving unit PCBs comprise:
a plurality of transformers operatively connected to the common line of the respective connection unit PCB;
a power source connector for applying power to the plurality of transformers;
a synchronization cable connector for synchronizing the first and second driving unit PCBs together, wherein the first and second connectors transmit power to the respective first or second connection unit PCB.

12. The backlight unit of claim 8, further comprising a light-scattering means formed of light-diffusion sheets and light-diffusion plates provided above the light-emitting lamps.

13. The backlight unit of claim 9, further comprising a light-scattering means formed of light-diffusion sheets and light-diffusion plates provided above the light-emitting lamps.

14. The backlight unit of claim 10, further comprising a light-scattering means formed of light-diffusion sheets and light-diffusion plates provided above the light-emitting lamps.

15. The backlight unit of claim 8, further comprising a reflective sheet formed on an inner surface of the lamp housing.

* * * * *